(12) United States Patent
Filippone

(10) Patent No.: US 12,040,100 B2
(45) Date of Patent: Jul. 16, 2024

(54) TRANSPORTABLE SUB-CRITICAL MODULES DISPOSED IN INTERMODAL TRANSPORT CONTAINER FOR POWER GENERATION

(71) Applicant: Claudio Filippone, College Park, MD (US)

(72) Inventor: Claudio Filippone, College Park, MD (US)

(73) Assignee: CARBON FREE HOLDINGS LLC, Lewes, DE (US)

( * ) Notice: Subject to any disclaimer, the term of this patent is extended or adjusted under 35 U.S.C. 154(b) by 46 days.

(21) Appl. No.: 17/315,364

(22) Filed: May 10, 2021

(65) Prior Publication Data
US 2022/0115156 A1   Apr. 14, 2022

Related U.S. Application Data

(63) Continuation of application No. 15/565,164, filed as application No. PCT/US2016/027102 on Apr. 12, 2016, now Pat. No. 11,031,148.
(Continued)

(51) Int. Cl.
*G21D 5/02* (2006.01)
*G21C 1/30* (2006.01)
(Continued)

(52) U.S. Cl.
CPC .............. *G21D 5/02* (2013.01); *G21C 1/30* (2013.01); *G21C 1/32* (2013.01); *G21C 7/30* (2013.01);
(Continued)

(58) Field of Classification Search
CPC .... G21D 5/02; G21C 1/30; G21C 1/32; Y10S 376/909
(Continued)

(56) References Cited

U.S. PATENT DOCUMENTS 3,086,933 A  *  4/1963  Nagey ..................... G21D 5/02
                                                    376/909
3,164,525 A  *  1/1965  Wetch ..................... G21D 5/06
                                                    376/909
(Continued)

FOREIGN PATENT DOCUMENTS

WO    WO-2014043335 A1 *  3/2014  ............. G21C 19/00

OTHER PUBLICATIONS

Berte, "Modularity in design of the MIT Pebble Bed Reactor", PhD diss., MIT, 2004. (Year: 2004).*
(Continued)

*Primary Examiner* — Peter M Poon
*Assistant Examiner* — Daniel Wasil

(57) ABSTRACT

A transportable nuclear power system is provided. The system includes a nuclear power generator. The nuclear power generator includes one or more fuel cartridges configured to form a critical core during a power generation operation, each of the one or more fuel cartridges containing a nuclear fuel. The nuclear power generator also includes a reactivity controller and one or more working fluid conduits, each work fluid conduit containing a working fluid circulating within each of the one or more fuel cartridges to cool the nuclear fuel and execute a thermodynamic cycle. The system also includes an Intermodal transport container including a support structure mounted inside the transport container to support at least the one or more fuel cartridges of the nuclear power generator. The one or more fuel cartridges of the nuclear power generator are contained in the transport container during the power generation operation.

6 Claims, 11 Drawing Sheets

Related U.S. Application Data

(60) Provisional application No. 62/284,707, filed on Oct. 7, 2015, provisional application No. 62/178,400, filed on Apr. 9, 2015.

(51) Int. Cl.

| | |
|---|---|
| *G21C 1/32* | (2006.01) |
| *G21C 7/30* | (2006.01) |
| *G21C 3/06* | (2006.01) |
| *G21C 3/16* | (2006.01) |
| *G21C 3/322* | (2006.01) |
| *G21C 11/02* | (2006.01) |
| *G21C 15/06* | (2006.01) |
| *G21G 1/02* | (2006.01) |

(52) U.S. Cl.
CPC ............... *G21C 3/06* (2013.01); *G21C 3/16* (2013.01); *G21C 3/322* (2013.01); *G21C 11/02* (2013.01); *G21C 15/06* (2013.01); *G21G 1/02* (2013.01); *Y02E 30/30* (2013.01); *Y10S 376/909* (2013.01)

(58) Field of Classification Search
USPC ........................................ 376/212, 317, 909
See application file for complete search history.

(56) References Cited

U.S. PATENT DOCUMENTS

| | | | | |
|---|---|---|---|---|
| 4,088,535 | A * | 5/1978 | Thompson | G21D 5/02 |
| | | | | 376/909 |
| 4,355,001 | A * | 10/1982 | Pierart | G21C 13/00 |
| | | | | 376/909 |
| 2006/0249664 | A1* | 11/2006 | Beinhocker | G01N 21/21 |
| | | | | 250/227.15 |
| 2010/0290578 | A1* | 11/2010 | Farrell | G21C 1/086 |
| | | | | 376/260 |

OTHER PUBLICATIONS

Patel, "A Multi-Modular Neutronically Coupled Power Generation System", PhD diss., Texas A & M University, 2012. (Year: 2012).*

Greenspan, "STAR: The Secure Transportable Autonomous Reactor System-Encapsulated Fission Heat Source", University of California, Berkeley (US), 2003. (Year: 2003).*

* cited by examiner

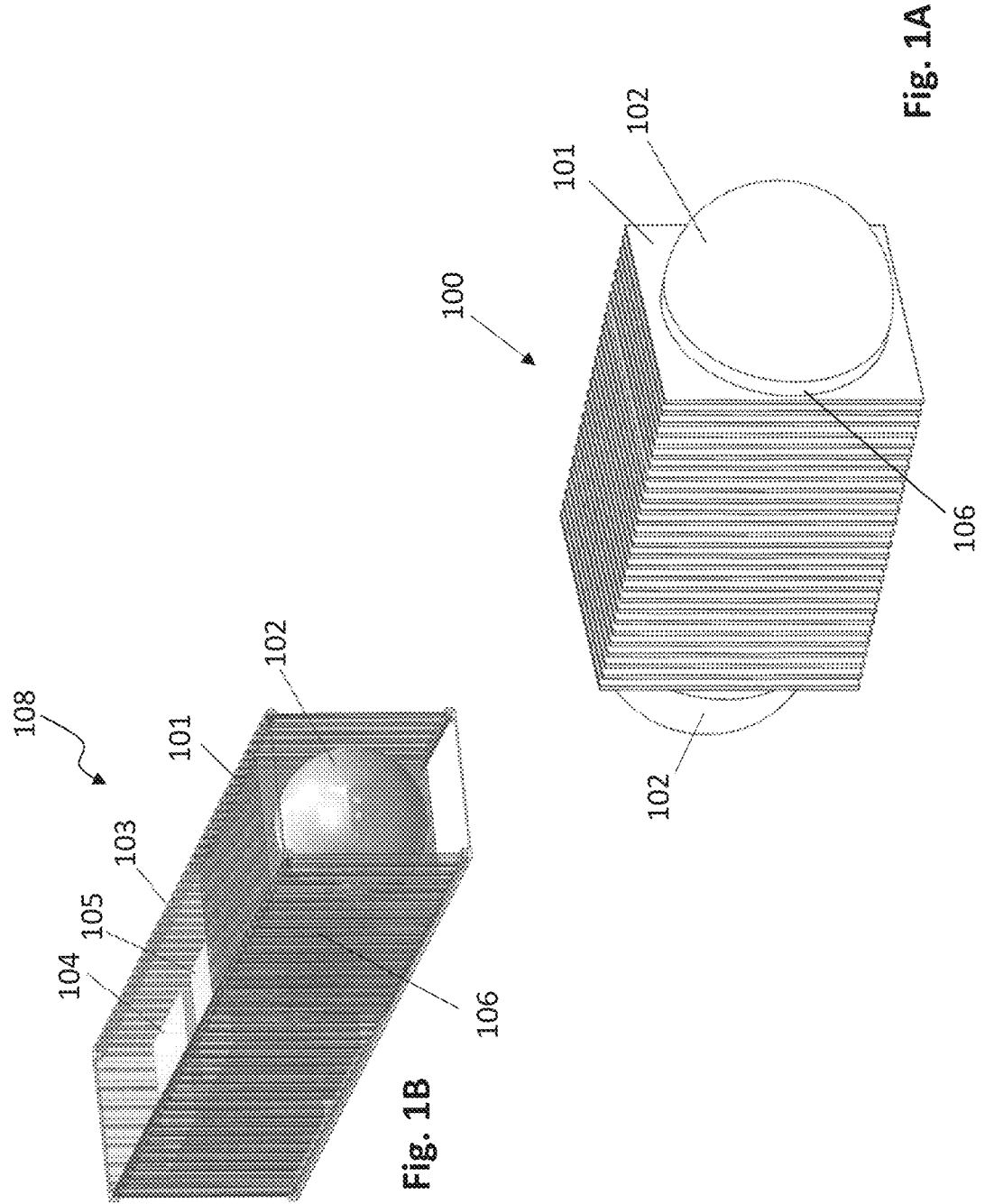

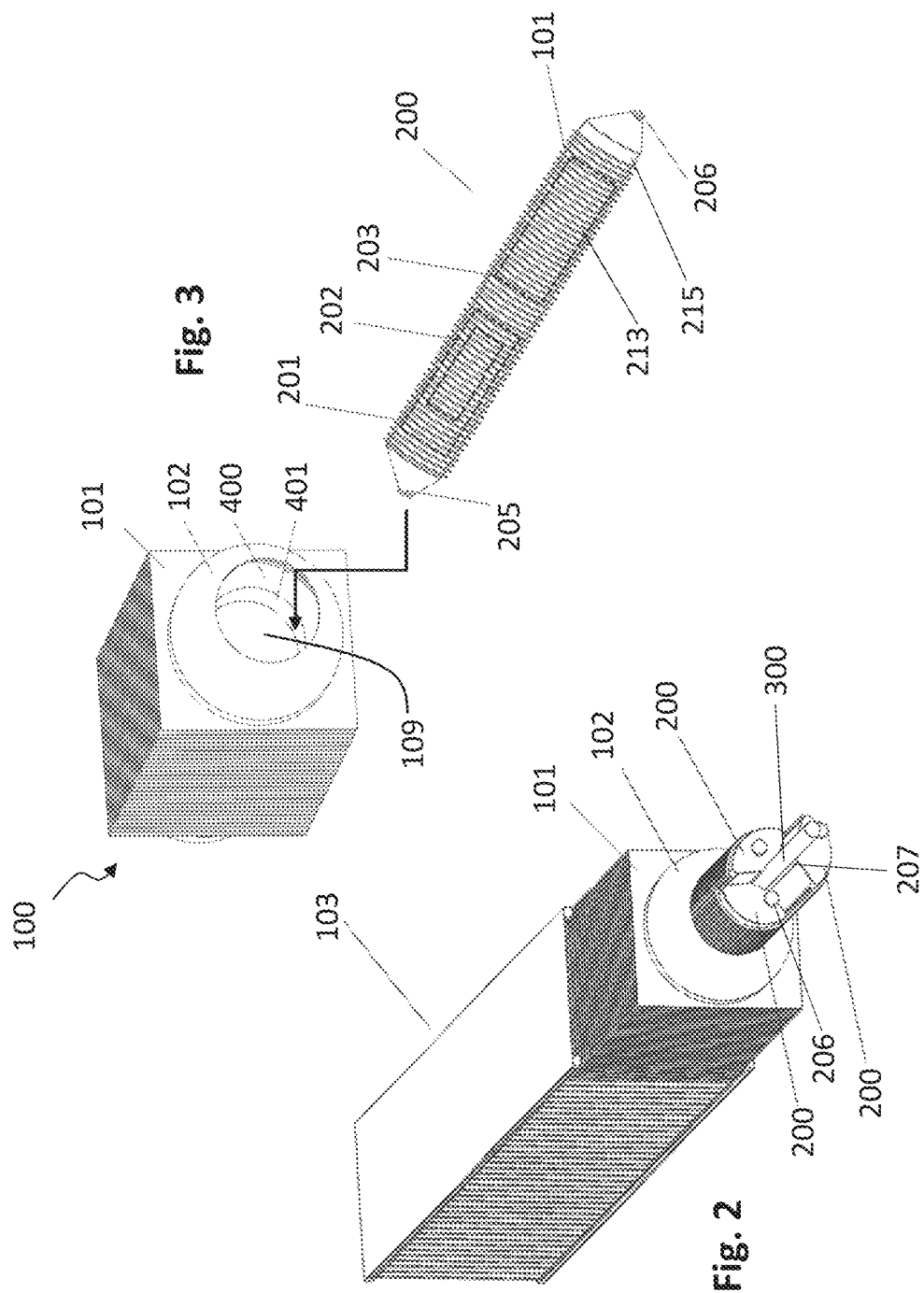

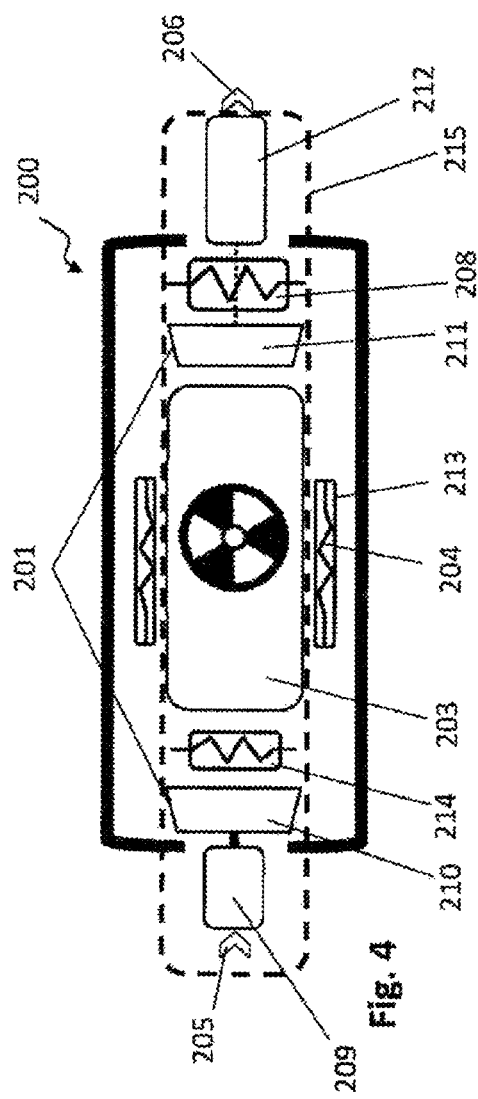
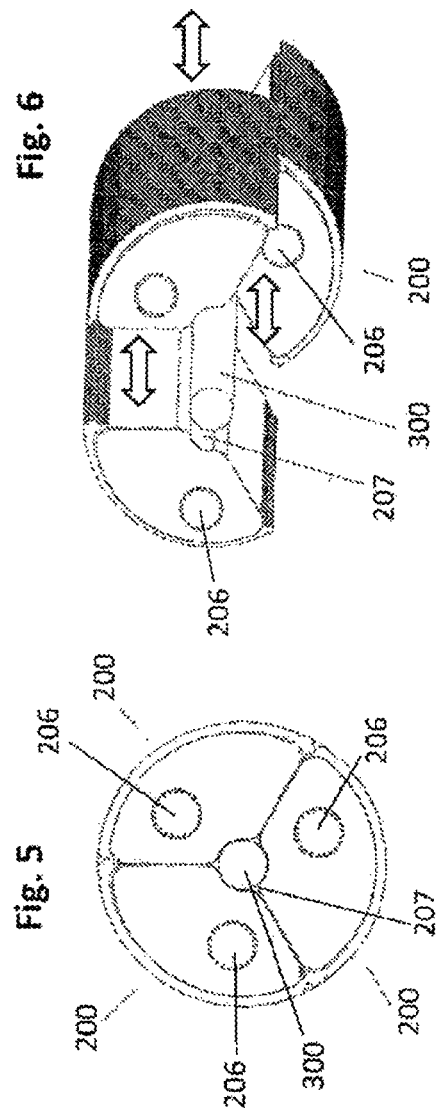

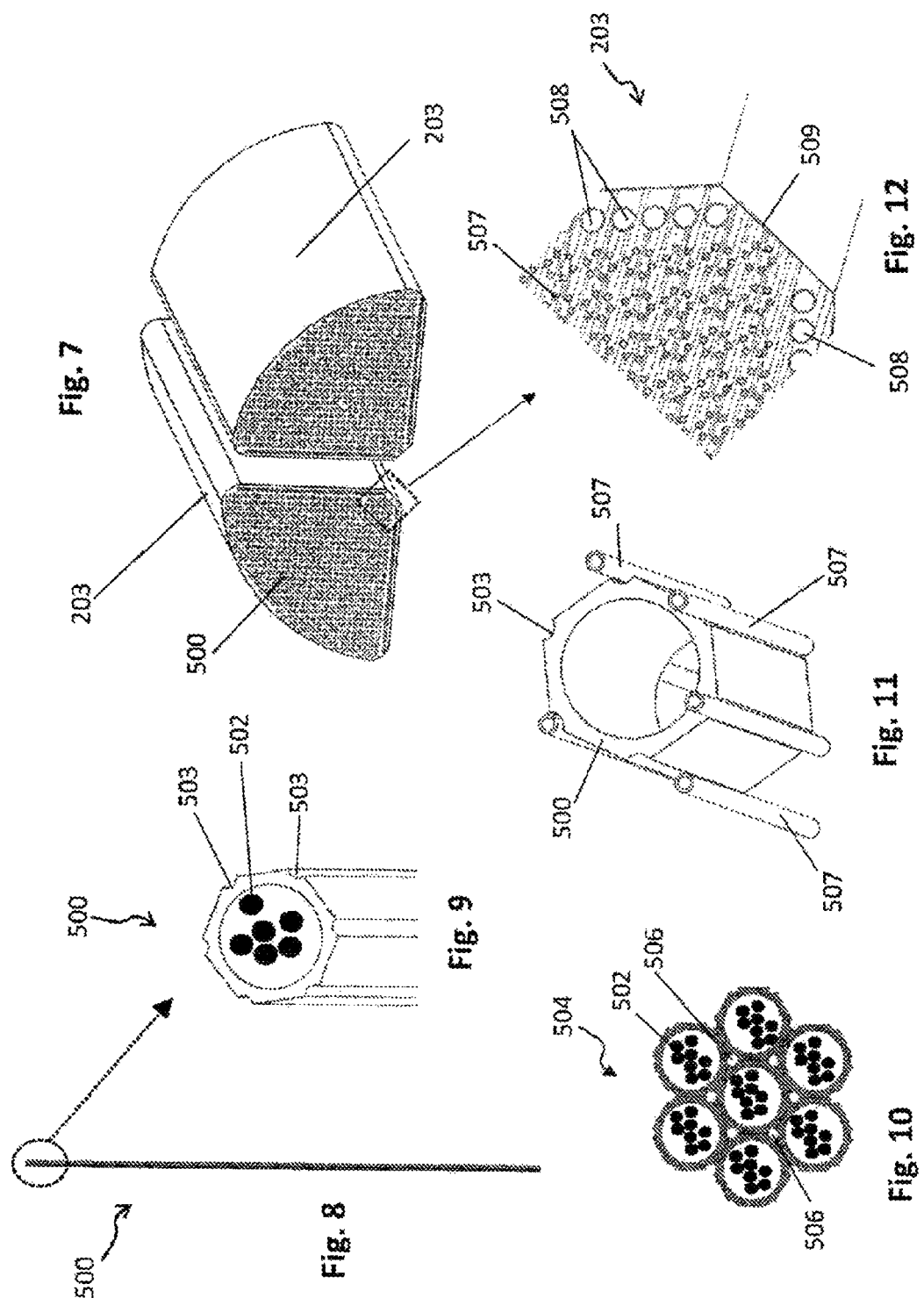

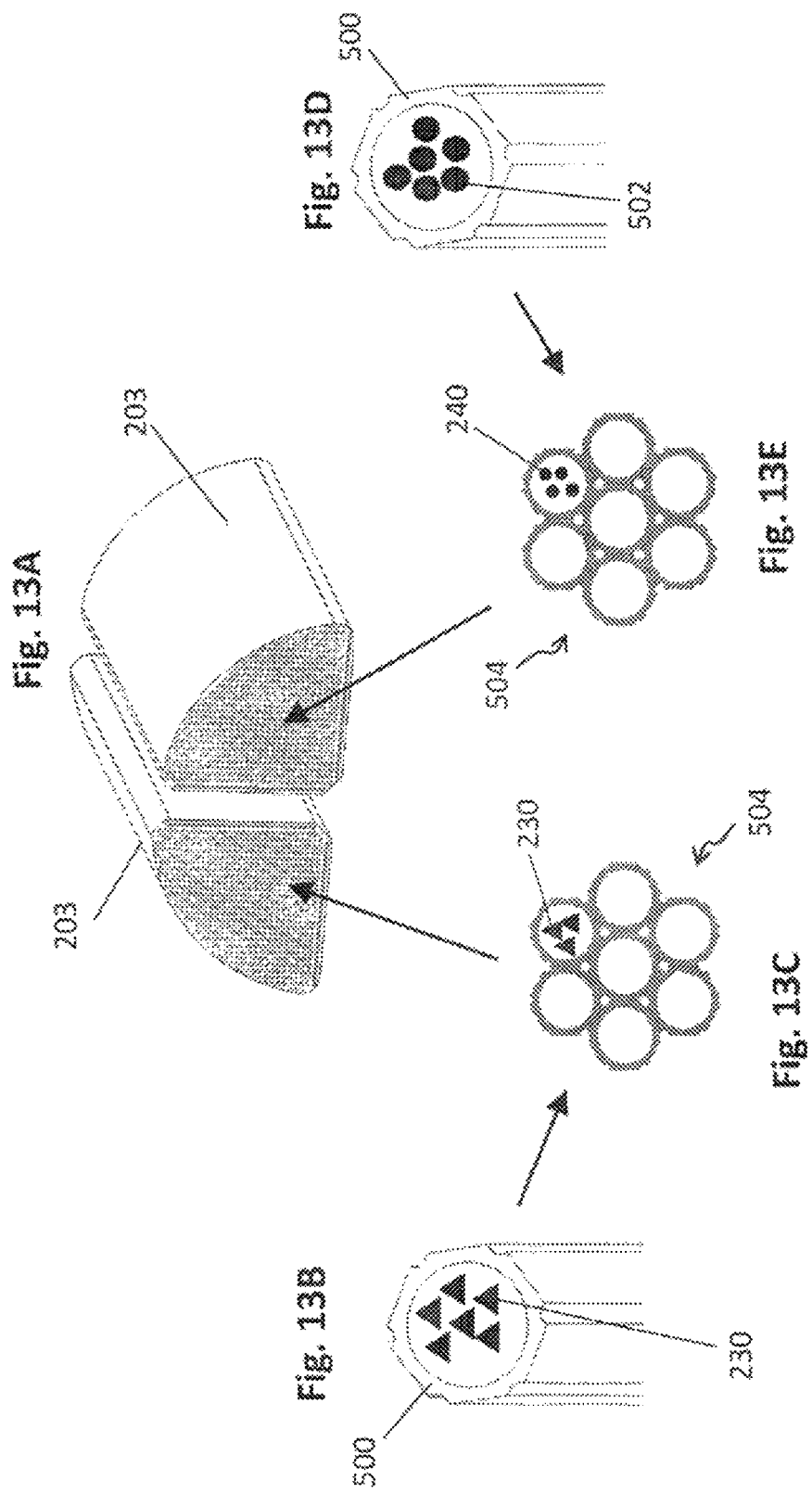

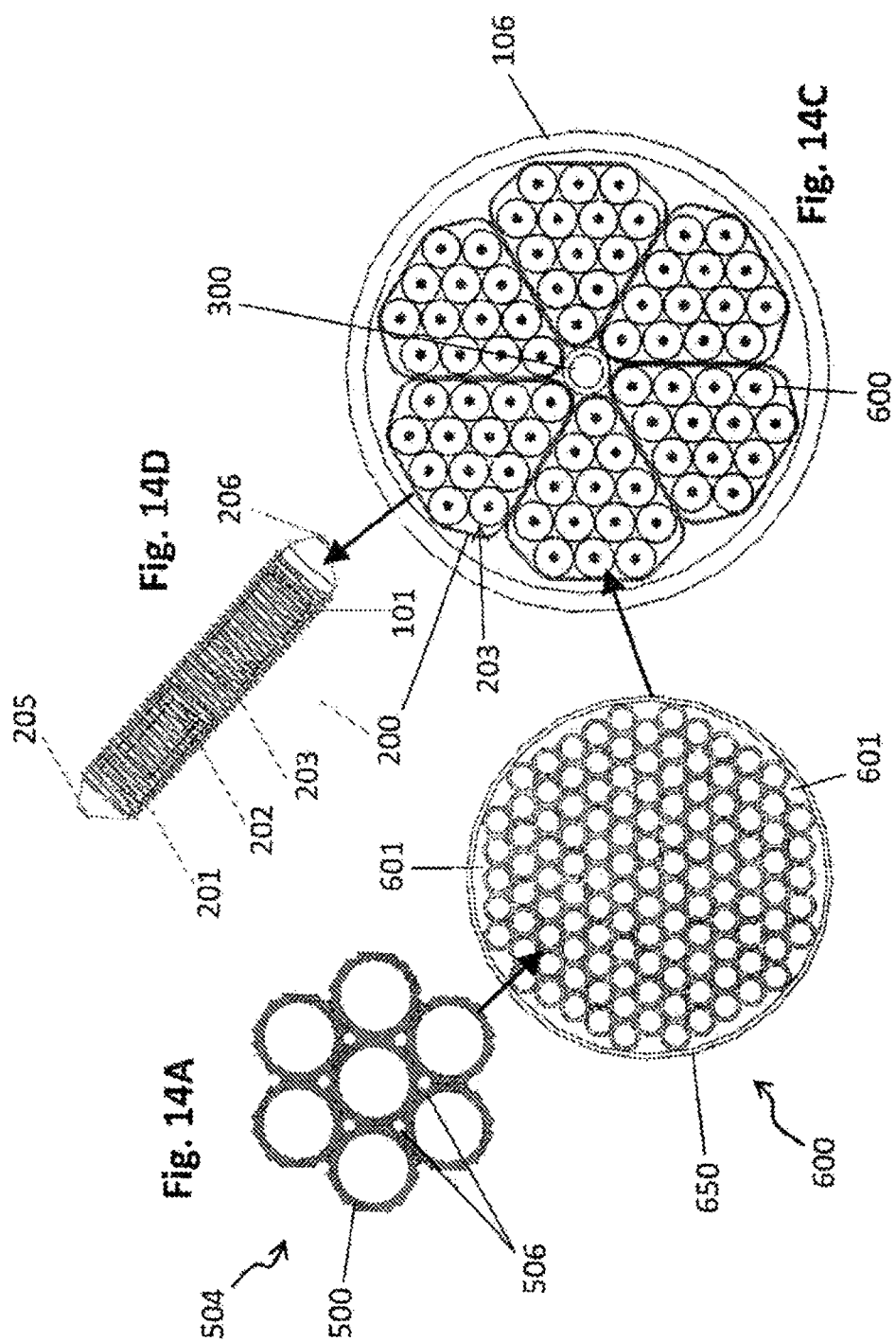

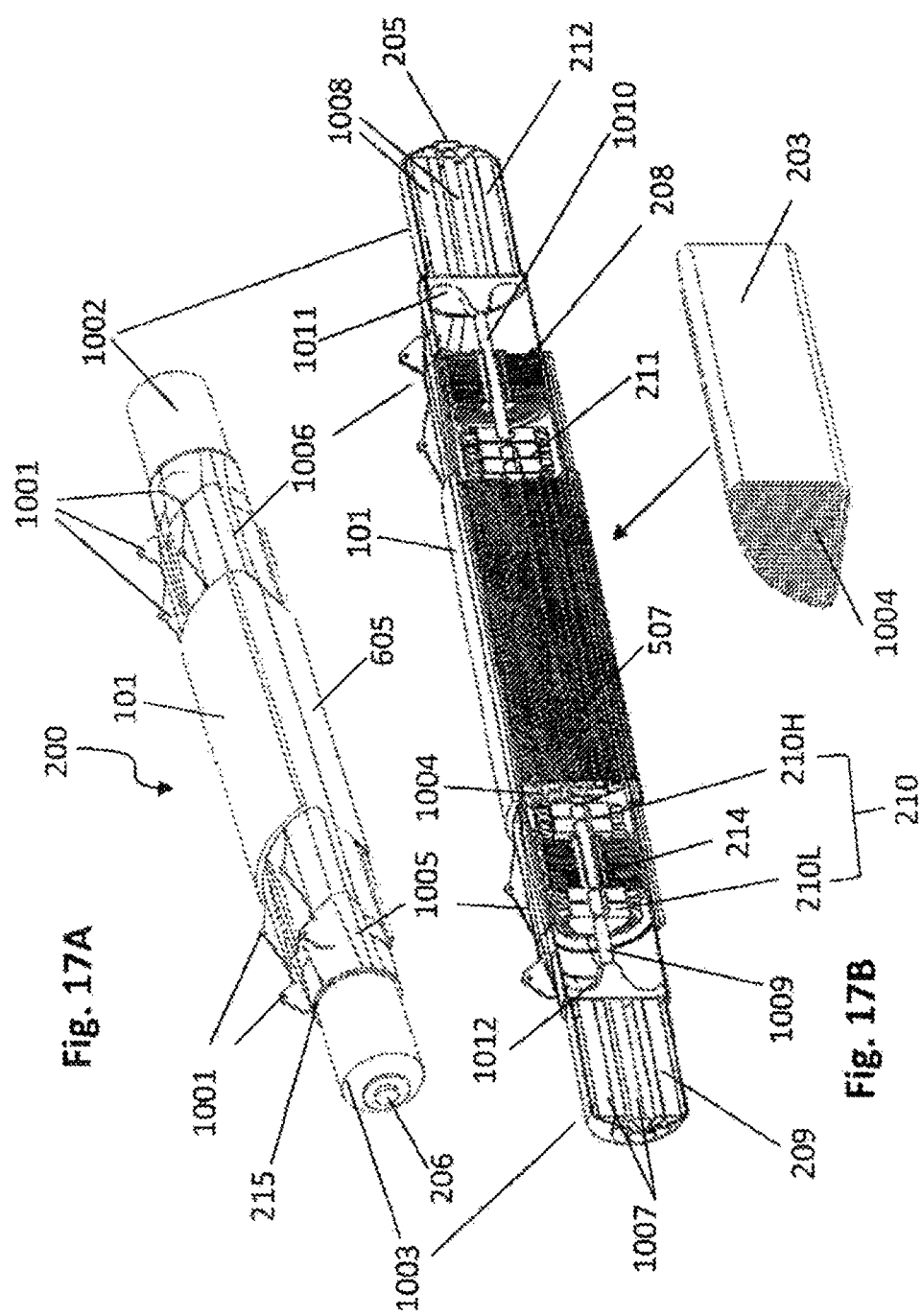

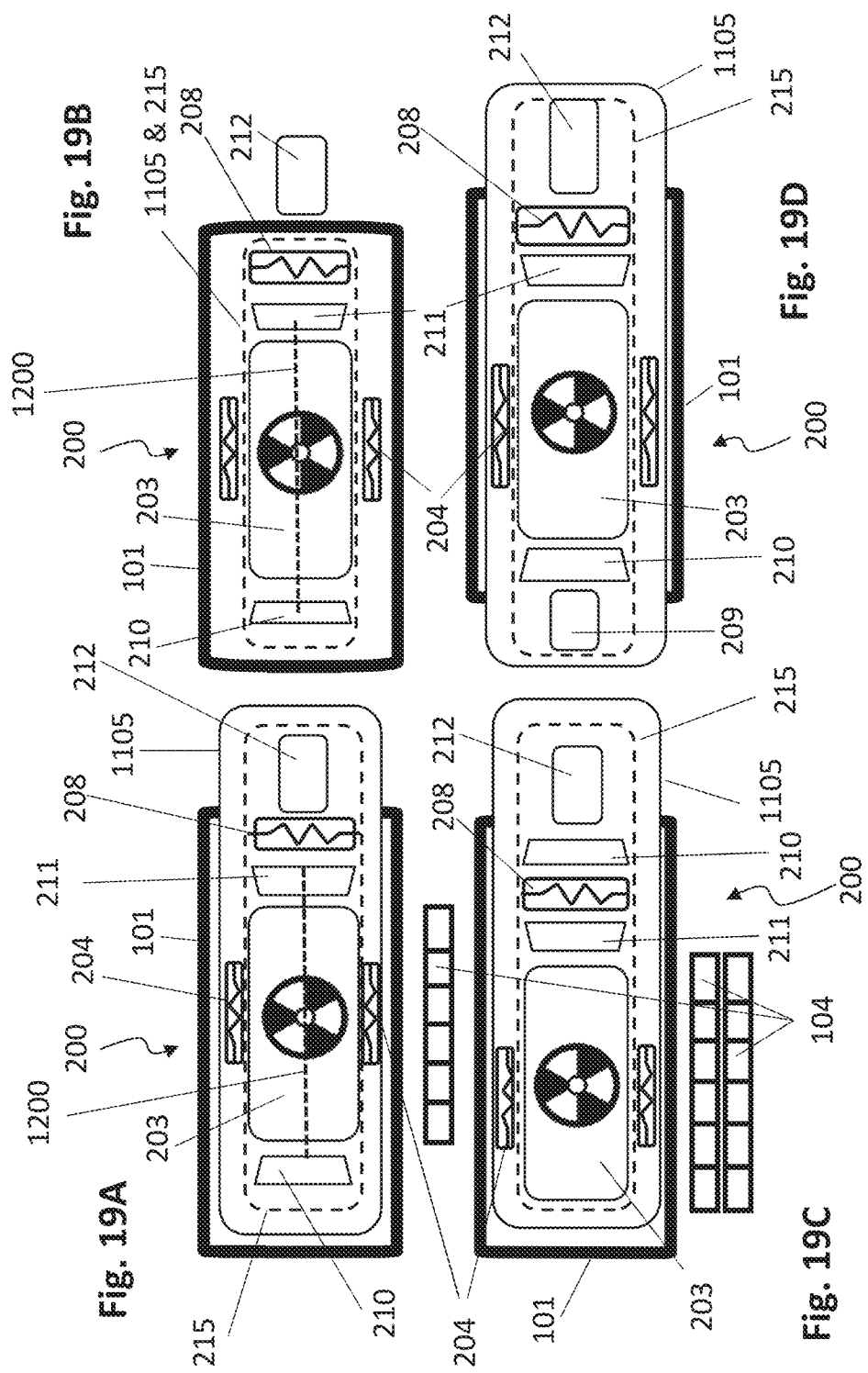

TRANSPORTABLE SUB-CRITICAL MODULES DISPOSED IN INTERMODAL TRANSPORT CONTAINER FOR POWER GENERATION

RELATED APPLICATIONS

This is a continuation application of U.S. application Ser. No. 15/565,164, filed Oct. 8, 2017, which claims the benefit of priority to U.S. Provisional Patent Application No. 62/284,707, titled "Holos Rapidly Deployable Highly-Integrated Micro Modular Reactor (HI-MMR)," filed on Oct. 7, 2015, and U.S. Provisional Patent Application No. 62/178,400, titled "Transportable Sub-critical Modules for Power Generation & Related Methods," filed on Apr. 9, 2015, the disclosure of both of which are hereby incorporated by reference in their entireties.

FIELD OF THE INVENTION

The present invention relates generally to nuclear power generators and related methods. More specifically, particular embodiments of the invention relate to a transportable, modular nuclear reactor that is inherently safe and deployable and retrievable within a few hours from reactor shutdown. In some exemplary embodiments, the nuclear reactor may enable power conversion and conditioning for remote electric generation via combined Brayton and Rankine power cycles.

DESCRIPTION OF RELATED ART

Nuclear generators comprise nuclear cores that naturally produce decay thermal energy after shutdown. Among several factors, the amount of energy nuclear fuel produces after shutdown is proportional to its power generation history and power density. To avoid overheating of the nuclear fuel, decay heat energy must be transferred from the nuclear core by redundant heat transfer mechanisms generally supported by systems external to the core. These systems require complex networks of piping to thermal-hydraulically couple the pressure vessel containing the core to heat exchangers generally located at a certain distance from the vessel to transfer thermal energy from the core to the environment (i.e. the Ultimate Heat Sink). Coolant flowing through the core and the heat exchangers may be actively circulated by electrically driven re-circulators (e.g., pumps, blowers). Alternatively, the coolant may be passively circulated through the core by gravity-driven natural circulation mechanisms based on coolant density changes. Modern nuclear reactors, independently of their size, rely on redundant core decay heat removal systems that may be operated passively, actively or a combination of both and are configured to operate external to the pressure vessel containing the nuclear fuel.

To remove thermal energy from the core, the designs adopting active safety features extensively rely on electric power for the core to be maintained within safe temperatures under all operating conditions as well as during core shutdown. To ensure safe operation, designs relying on active safety systems require access to electric power via dedicated redundant on-site emergency diesel generators and to off-site multiple power grids at all times.

Designs relying on passive safety features, on the other hand, rely on gravity and large inventories of coolant (e.g., water), generally stored in tanks or water storage structures (e.g., lined concrete pools) positioned at relatively high elevations with respect to the nuclear core. The elevation differential between the core and the coolant storage tank or structure is required to ensure that the coolant undergoes natural circulation siphoning and effectively removes decay thermal energy from the core. For passive safety features based on large coolant inventories, adequately providing long-term decay heat removal is highly dependent on the ability of replenishing coolant inventories over relatively short amounts of time. Core cooling effectiveness based on passive recirculation systems is strongly dependent on the environmental temperature and humidity conditions represented by the Ultimate Heat Sink. Generally, as environmental temperature increases, the ability to passively and effectively execute natural convective cooling becomes gradually impaired. As a result, passive decay heat removal based on gravity-driven coolant recirculation is best suited for nuclear generators operating in mild climates.

Passive and active safety systems are formed by sets of components that generally develop externally to the pressure vessel containing the core. The result is a complex system of redundant piping, valves, and heat exchangers for passive systems with the addition of pumps/blowers and motive power managed and monitored by control cabling.

Nuclear cores of commercially operating reactors, as well as those of water moderated Small Modular Reactor (SMR) designs, are generally loaded with nuclear fuels cladded with materials that oxidize in the presence of high temperature water/steam. As the core experience overheating due, for example, to loss of coolant, or failure of the active or passive core decay heat removal systems, chemical reactions between cladding materials and water/steam result in the production of hydrogen. Hydrogen then accumulates and self-ignites, thereby posing severe safety challenges. To address hydrogen production as a result of nuclear accidents, nuclear power plants employ redundant hydrogen management equipment to, for example, execute controlled ignitions and prevent accumulation of large hydrogen amounts. These safety systems do require electric power to operate and further add complexity to the overall balance of plant while increasing operating cost. Redundancies are generally the result of probabilistic risk assessments and postulated design basis accidents. Despite redundancies represented by multiple power grid accessibility, multiple emergency diesel generators, and the availability of on-site power grid supplied by batteries with a capacity to provide control and emergency motive power for several hours, core meltdown and hydrogen explosions have occurred throughout the history of nuclear power (e.g., see accident scenarios and consequences represented by the Fukushima Daiichi power station). This demonstrates that catastrophic accidents, as those triggered by beyond design basis accidents and represented, for example, by extreme seismic events (e.g., tsunami), combined with loss of power grid, have an unacceptable safety and economic impact even though their probability of occurrence is very low as predicted by probabilistic risk assessments.

One of the key requirements for transportable Micro Modular Reactor (MMR) designs is the total weight represented by the power producing system. PCT International Application number PCT/US2013/059445 describes a "Modular Transportable Nuclear Generator" formed by a nuclear core integrated with the power conversion unit. In this example, the core is developed as a super-critical system controlled over time by active control mechanisms and burnable neutron absorbers embedded all together with the fuel. For this system to be operational, the total mass of the core, power conversion system, integral pressure vessel and shields is still too high for commonly available lifting and transporting equipment. Additionally, the heat rejection represented by this system during normal operations and off-normal conditions still poses serious challenges to ensure that the temperature at the center of a relatively large core remains within safe margins under all credible design basis operating and accident scenarios.

SUMMARY

The present invention relates to nuclear power generation by modular sub-components that form critical and super-critical systems when assembled to form a whole system, thus enabling power generation via clusters of mobile Micro Modular Reactors (MMRs) that can match various power demands at sites with a weak power grid or sites where one or multiple MMRs represent a power station feeding the local power grid. The disclosed MMR interfaces with the power grid directly or via switchyard/sub-station. It can also support power generation where the MMR represents the grid (e.g., island power generation) as required for remote "off-the-grid" applications. In particular, the present invention relates to various power generation components that utilize fission and decay heat nuclear energy to, for example, provide electricity and process heat to mobile units (e.g., marine vessels) and to stationary installation (e.g., land and sea oil-rigs). The present invention can also provide support power to non-dispatchable renewable energy generators (e.g., wind, solar, etc.), as well as to forward operating and remote military bases as its functioning is not impaired by environmental extremes and does not require infrastructure at the site of deployment.

It is an object of the present invention to provide a transportable, fully-sealed sub-critical power generation module which provides shielding to gamma radiation during transport and neutron and gamma radiation during normal operation. In some exemplary aspects, the disclosed power generation module may satisfy one or more of the following requirements: i) it is light weight and fully contained within dimensions and weight requirements characterizing conventional transport cargo via containers under the International Organization for Standardization (ISO-containers) to ensure transportability via standard transport platforms; ii) it is inherently sub-critical and becomes super-critical only when multiple sub-critical modules are assembled together at the deployment site; iii) it does not require on-site balance of plant connections as the disclosed MMR is operational independently of the electric load type (e.g., power grid, sub-station, and switchyard) and performs rapid load following; iv) it only relies on environmental air for cooling; v) each sub-critical module provides a universal core platform so as to offer an interface for various types of fuel and moderators all contained within a universal fuel cartridge loaded with non-proliferant fuels enriched to significantly less than 19% while providing a minimum of 3,650 Full Effective Power Days (FEPD) at minimum 11 MWth (Mega-Watt-thermal); vi) each sub-critical module, at the end of the fuel cycle, fits within a standard waste disposal canister and automatically generates electricity for underground permanent storage to satisfy thermal loading requirements at permanent geological repositories; vii) it can be operated remotely; viii) it provides extra-pressure vessel control capabilities; ix) it provides sealed access to sub-critical cores for sensors and probes to ease their replacement or refurbishment; x) it provides protected access via sealed ports integrated within sub-critical core regions to support selective isotopic production; xi) it can withstand hostile attacks without releasing volatiles even under breached core scenarios; xii) it complies with "zero-evacuation planning zone" requirements (as it does not produce volatiles under worst case hostile attack or sabotage scenarios).

To attain the advantages and in accordance with the purpose of the invention, as embodied and broadly described herein, one aspect of the invention provides a transportable passive-cooling nuclear power generator formed by fully sealed and independent portions of a nuclear core contained within reinforced structures that provide thermal-hydraulic and shielding features during transport and operation.

Additional objects and advantages of the invention will be set forth in part in the description that follows, and in part will be obvious from the description, or may be learned by practice of the invention. The objects and advantages of the invention will be realized and attained by the elements and combinations particularly pointed out in the appended claims.

It is to be understood that both the foregoing summary description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several embodiments of the invention and together with the description, serve to explain the principles of the apparatus and methods describing the MMR and its various components.

FIG. 1A is a perspective view of a nuclear power generator, according to an exemplary embodiment of the invention.

FIG. 1B is a perspective view of the nuclear power generator shown in FIG. 1A in a transportable container, according to an exemplary embodiment of the invention.

FIG. 2 is a perspective view of three subcritical power modules assembled to form an operable nuclear power system.

FIG. 3 is a perspective view of the subcritical power module being inserted into an interior space of the nuclear power generator.

FIG. 4 is a functional schematic of the subcritical power module, according to one exemplary embodiment.

FIGS. 5 and 6 are frontal and perspective views of three subcritical power modules assembled to form an operational power system.

FIG. 7 is a partial perspective view of fuel cartridges, according to one exemplary embodiment.

FIG. 8 is a perspective view of a fuel sleeve, according to one exemplary embodiment.

FIG. 9 is a partial exploded view of the top portion of the fuel sleeve shown in FIG. 8.

FIG. 10 is a partial, cross-sectional view of the fuel cartridge of FIG. 7, illustrating a matrix of fuel sleeves.

FIG. 11 is a schematic perspective view of a fuel sleeve with a plurality of cooling tubes.

FIG. 12 is a partial, exploded view of the dotted portion of the fuel cartridge shown in FIG. 7.

FIGS. 13A-α illustrate two fuel cartridges having types of fuel elements different from one another.

FIGS. 14A-D illustrate a fuel cartridge of a subcritical power module, according to another exemplary embodiment.

FIG. 17A is a perspective view of a subcritical power module, according to another exemplary embodiment.

FIG. 17B is a cross-sectional view of the subcritical power module shown in FIG. 17A, illustrating various internal components therein.

FIGS. 19A-19D illustrate different configurations of a power conversion unit of a subcritical power module, according to various exemplary embodiments of the present disclosure.

DETAILED DESCRIPTION

Figure 15B:
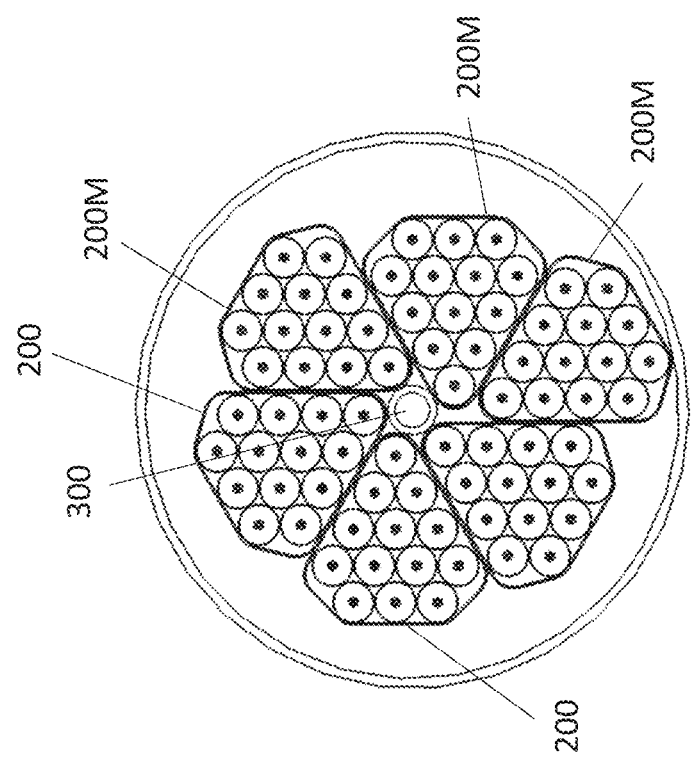
FIG. 15A-B illustrate a critical state and a subcritical state, respectively, of subcritical power modules of a nuclear power generator, according to one exemplary embodiment.

Reference will now be made in detail to the exemplary embodiments of the invention, examples of which are illustrated in the accompanying drawings. Wherever possible, the same reference numbers will be used throughout the drawings to refer to the same or like parts.

FIG. 1A illustrates a nuclear power generator 100, according to one exemplary embodiment of the present disclosure. As shown in FIG. 1A, nuclear power generator 100 may include a generally cylindrical body 106 and a pair of hemispherical heads 102 integrally formed with the proximal and distal ends of cylindrical body 106. Cylindrical body 106 and hemispherical heads 102 form a substantially sealed pressure containment that serves as a pressure boundary separating the internal components of nuclear power generator 100 from the environment. Cylindrical body 106 and hemispherical heads 102 also serve as radiation shielding from the nuclear components inside the pressure containment.

Nuclear power generator 100 may also include a radiation shield 101 surrounding at least cylindrical body 106 of the pressure containment. Radiation shield 101 may also provide thermal coupling for heat rejection from the internal components inside the pressure containment to the environment.

Nuclear power generator 100 may be configured to fit inside a transport container 103 (e.g., ISO-container), so that it can be transported using a conventional transport equipment, as shown in FIG. 1B. The structure of transport container 103 may serve as heat transfer mechanisms to transfer thermal energy from nuclear power generator 100 to the environment.

In the exemplary embodiment shown in FIG. 1B, transport container 103 may include not only nuclear power generator 100 but also a number of auxiliary components to form an entire power station 108 therein. For example, as shown in FIG. 1B, transport container 103 may also include one or more battery banks 104 and a communication equipment 105. One or more battery banks 104 are used to support, for example, start-up and load-following operations. Battery banks 104 may also provide radiation shielding from nuclear power generator 100 to the environment. Communication equipment 105 may be used to control nuclear power generator 100 remotely via, for example, wireless communication.

Nuclear power generator 100 includes a plurality of sealed subcritical power modules 200 that together form an operable nuclear power system. For example, FIGS. 2 and 3 show an exemplary embodiment of nuclear power generator 100 having three subcritical power modules 200 slidably arranged inside the pressure containment of nuclear power generator 100. While FIGS. 2 and 3 illustrate an embodiment having three subcritical power modules 200 inside nuclear power generator 100, it should be understood that nuclear power generator 100 may have more than three subcritical power modules 200, as shown in, for example, FIGS. 14A-D, 15A-B, and 16A-B. The plurality of subcritical power modules 200 form a substantially cylindrical outer shape when they are arranged in the pressure containment, as shown in, for example, FIGS. 2, 5, and 6. As described in more detail later, the criticality of nuclear fuels contained in subcritical power modules 200 can be controlled by relatively moving subcritical power modules 200 with respect to one another.

In the exemplary embodiment shown in FIGS. 2 and 3, hemispherical head 102 includes a head housing 400 that defines an opening 109, and subcritical power modules 200 are slidably inserted into the interior of nuclear power generator 100 through opening 109. Opening 109 can be closed with a suitable cap or seal. Head housing 400 includes a suitable actuator 401 to structurally support the plurality of subcritical power modules 200 in the pressure containment and to slidably move subcritical power modules 200 in and out of alignment inside the pressure containment.

As shown in FIG. 3, subcritical power module 200 includes a sealed housing 215 and contains a power conversion unit 201, an internal controller 202, and a fuel cartridge 203 inside housing 215. Housing 215 can be made of a suitable radiation shielding material. Subcritical power module 200 may also include a radiation shield 213 disposed adjacent to fuel cartridge 203. Subcritical power module 200 may include a first access port 205 to connect to off-site control stations for remote control of subcritical power module 200 and a second access port 206 to connect to an external equipment for generating conditioned electric power with load-following, self-regulating characteristics. Internal controller 202 provides an interface among electrical, thermodynamic, neutronic, and positioning data of subcritical power module 200 through first and second access ports 205 and 206. The operations of internal controller 202 may also be supported by interfaces outside of subcritical power module 200 that are wirelessly connected to internal controller 202.

FIG. 4 is a functional schematic of subcritical power module 200, according to one exemplary embodiment. As shown in the figure, subcritical power module 200 includes fuel cartridge 203 and power conversion unit 201 for converting heat energy generated from fuel cartridge 203 into electrical power. In this exemplary embodiment, power conversion unit 201 operates with two distinct turbo-machinery components operating within the pressure boundary formed by housing 215 of subcritical power module 200: a compressor turbine 210 disposed at a proximal end of fuel cartridge 203 and a power turbine 211 coupled to generator 212 and disposed at a distal end of fuel cartridge 203. Compressor turbine 210 is electrically driven by a motor 209, and power turbine 211 is driven by a working fluid flowing out of fuel cartridge 203. The working fluid may be a gas for cooling fuel cartridge 203, but any fluid with thermal- and radiation-properties compatible with the type of nuclear fuel and thermodynamic cycle of subcritical power module 200 can be used. After expansion in power turbine 211, the working fluid transfers a portion of its energy to a first recuperator heat exchanger 208 and a second recuperator heat exchanger 204. First recuperator heat exchanger 208 is configured to receive thermal energy from the working fluid discharged by power turbine 211 and transfer the recovered thermal energy to a secondary working fluid. Second recuperator heat exchanger 204 is configured to receive thermal energy from the working fluid and from radiation shield 213, which is thermally coupled to second recuperator heat exchanger 204, and transfer the recovered thermal energy to the secondary working fluid. A more detailed description of the thermodynamic functions of power conversion unit 201 will be provided with reference to FIG. 18.

FIGS. 5 and 6 are frontal and perspective views of three subcritical power modules 200 assembled to form an operational, critical power system. In this embodiment, subcritical power modules 200 are supported inside nuclear power generator 100 in a manner that each of subcritical power modules 200 can slide with respect to one another, as shown in FIG. 6. The capability to move at least one of the plurality of subcritical power modules 200 with respect to the other of the plurality of subcritical power modules 200 enables the control of the geometric and material buckling necessary to achieve critical, supercritical, or subcritical condition of fuel cartridges 203. For example, each subcritical power module 200 can be moved to cause alignment or misalignment of the geometric and material buckling required to sustain chain reactions without the need to insert control rods into fuel cartridge 203 of subcritical power module 200. Further, subcritical power modules 200 may be configured such that the nuclear fuel contained in each fuel cartridge 203 remains in a subcritical state when at least one subcritical power module 200 is not in alignment with other subcritical power modules 200. The nuclear fuel in each fuel cartridge 203 reaches a critical state when all of subcritical power modules 200 are in alignment with respect to one another, thus forming a compact, critical core.

Referring to FIGS. 5 and 6, a tapered end of each subcritical power module 200, opposite to its outer surface, includes a recess that, together with the recesses of the other subcritical power modules 200, defines a central channel 207 positioned substantially at the center of nuclear power generator 100. Central channel 207 is used to movably insert a tubular member 300 in and out of nuclear power generator 100. In some exemplary embodiments, tubular member 300 may be or include an extra core reactivity controller in solid or liquid form (e.g., control rod or neutron absorber) that can be operated outside of housing 215 of subcritical power module 200. For example, the reactivity controller can be inserted into central channel 207 to force a subcritical condition when, for example, actuator 400 for moving subcritical power modules 200 is jammed or malfunctions. In another exemplary embodiment, tubular member 300 may be used to hold a sample for irradiation inside nuclear power generator 100, without entering fuel cartridge 203.

FIG. 7 illustrates an exemplary embodiment of fuel cartridges 203 of subcritical power modules 200. Fuel cartridges 203 of FIG. 7 are shown without their respective housings 215, and each fuel cartridge 203 is configured to be inserted into housing 215 of subcritical power module 200. Fuel cartridge 203 of this embodiment is designed to be used with subcritical power module 200 shown in, for example, FIGS. 16A-B and 17A-B, where four subcritical power modules 200 constitute an operable nuclear power system. It should be understood that fuel cartridge 203 may have many different configuration depending on the type and design of subcritical power module with which fuel cartridge 203 is used.

Fuel cartridge 203 comprises a plurality of fuel sleeves 500 for receiving nuclear fuel elements 502. For example, as shown in FIGS. 8 and 9, each of the plurality of fuel sleeves 500 may be an elongated tube having an interior space for receiving nuclear fuel elements 502. Nuclear fuel elements 502 may be TRISO fuel or other types of nuclear fuels (e.g. ceramic-based).

The plurality of fuel sleeves 500 in fuel cartridge 203 are stacked against one another in a matrix 504, as shown in FIG. 10. Each fuel sleeve 500 has an outer cross-sectional shape of a regular hexagon and an inner cross-sectional shape of a circle. Each vertex of the regular hexagon has a curved recess 503, such that three fuel sleeves 500 collectively define a cooling channel 506 when the plurality of fuel sleeves 500 are stacked against one another in matrix 504. Accordingly, a plurality of cooling channels 506 are formed between the plurality of fuel sleeves 500 when the plurality of fuel sleeves 500 are stacked against one another in matrix 504.

The working fluid may flow through the plurality of cooling channels 506 to transfer heat generated by fuel elements 502 without directly contacting or mixing with fuel elements 502. In some exemplary embodiments, a cooling tube 507 may be disposed inside each of the plurality of cooling channels 506, as shown in FIG. 11. Once fuel sleeves 500 are loaded with fuel elements 502 and placed in fuel cartridge 203, fuel cartridge 203 can be sealed and supported by one or more tube sheets.

FIG. 12 is a partial, exploded view of fuel cartridge 203 (i.e., a portion indicated with a dotted line in FIG. 7). As shown in the figure, fuel cartridge 203 may include one or more internal tube 508 positioned in a peripheral portion of fuel cartridge 203. Internal tubes 508 provide access to various regions of fuel cartridge 203 from outside of subcritical power module 200 and are used to insert instrumentation, isotope production equipment, and/or control element inside fuel cartridge 203.

According to some exemplary embodiments, fuel cartridges 203 may operate with different types of fuel elements 502 since the neutronics of the whole core (i.e., constituted by four fuel cartridges 203 in this embodiment) is the combined result of the neutronics of individual subcritical power modules 200. For example, as illustrated in FIGS. 13A-13E, one of fuel cartridges 203 may be loaded with fuel sleeves 500 containing fissile materials 230 (FIGS. 13B and 13C), while another fuel cartridge 203 may be loaded with fuel sleeves 500 containing TRISO fuel 240 (FIGS. 13D and 13E). This illustrates that the whole core of nuclear power generator 100 can be formed by substantially different isotopic fissile and fissionable species. For example, the whole core constituted by three subcritical power modules 200 may comprise a first fuel cartridge 203 containing a Thorium-based fuel, a second fuel cartridge 203 containing Uranium-based fuel, and a third fuel cartridge 203 containing Plutonium-based fuel. In other words, the configuration of nuclear power generator 100, where the whole core is constituted by individualized subcritical power modules 200, enables burning of different types of nuclear fuels.

FIGS. 14A-14D illustrate fuel cartridge 203 of subcritical power module 200, according to another exemplary embodiment. Fuel cartridge 203 of this embodiment differs from the previous embodiments in that fuel cartridge 203 uses a plurality of fuel bundles 600 to contain matrix 504 of fuel sleeves 500. As shown in FIGS. 14A and 14B, fuel bundle 600 is formed by a tubular housing 650 and a plurality of fuel sleeves 500 stacked against one another inside tubular housing 650. In addition to cooling channels 506 formed between fuel sleeves 500, fuel bundle 600 includes peripheral cooling channels 601 formed between the outer walls of fuel sleeves 500 located in the peripheral region and the inner wall of tubular housing 650. Referring to FIGS. 14C and 14D, fuel cartridge 203 is formed of a plurality of fuel bundles 600 and is inserted into subcritical power module 200.

In the embodiment shown in FIGS. 14A-14D, nuclear power generator 100 is shown to have a total of six subcritical power modules 200, it should be understood that nuclear power generator 100 may have more or less than six subcritical power modules 200. For example, the number of subcritical power modules 200 in nuclear power generator 100 may depend on a variety of factors, such as dimensional constraints, weight limitations, permitted enrichment levels (e.g., less than 19% to meet non-proliferation requirements), Full Effective Power Days (FEPDs), and power ratings. Nuclear power generator 100 with the flexibility in the number of individualized subcritical power modules 200 allows meeting different requirements and power ratings.

Figure 15A:
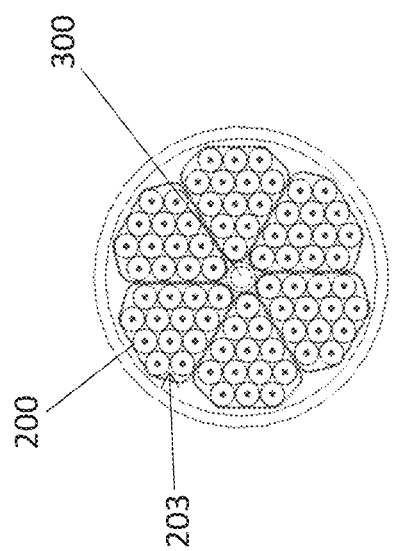

FIGS. 15A and 15B illustrate a critical state and a subcritical state, respectively, of subcritical power modules 200 of nuclear power generator 100, according to one exemplary embodiment. In a critical state shown in FIG. 15A, all of six subcritical power modules 200 are centrally aligned and therefore satisfy the geometric and material buckling requirements for sustaining chain reaction and producing power. In this configuration, the whole core represented by fuel cartridges 203 of six subcritical power modules 200 are geometrically symmetric with respect to its center. In a subcritical state shown in FIG. 15B, at least one subcritical power module 200M is misaligned with respect to other subcritical power modules 200, and the geometric and material buckling requirements for sustaining chain reaction are not satisfied. In this configuration, the misalignment of at least one subcritical power module 200M causes the whole core to be asymmetric, thereby inducing the core to a subcritical condition and maintaining nuclear power generator 100 in a shutdown condition.

FIGS. 16A-D show another exemplary embodiment of a subcritical power module 200 assembled in a support structure 900 to form an operational nuclear power system. For illustration purposes, only one of four subcritical power modules 200 is shown in the figures. In this embodiment, a total of four subcritical power modules 200 are connected to support structure 900 through actively controlled movement controllers 901, such that each of subcritical power modules 200 can move axially and radially with respect to one another. Similar to the embodiments described above, the capability to move at least one of the plurality of subcritical power modules 200 with respect to the other of the plurality of subcritical power modules 200 enables the control of the geometric and material buckling necessary to achieve critical, supercritical, or subcritical condition of fuel cartridges 203. For example, each subcritical power module 200 can be moved to cause alignment or misalignment of the geometric and material buckling required to sustain chain reactions without the need to insert control rods into fuel cartridge 203 of subcritical power module 200. Further, subcritical power modules 200 may be configured such that the nuclear fuel contained in fuel cartridges 203 remains in a subcritical state when at least one subcritical power modules 200 is not in alignment with other subcritical power modules 200 and reach a critical state when all of the subcritical power modules 200 are in alignment with respect to one another thus forming a compact core.

Support structure 900 can be fitted inside a transport container 103 (e.g., ISO-container shown in FIG. 1B) and is configured to provide structural support to a plurality of subcritical power modules 200. Movement controllers 901 are distributed symmetrically in support structure 900, and each movement controller 901 is connected to a frame coupler 903 of support structure 900 at one end and to a module coupler 1001 (see FIG. 17A) of subcritical power module 200 at the other end. Movement controllers 901 can move subcritical power module 200 in all directions (e.g., axial and radial directions) while adequately supporting the weight of subcritical power module 200. Movement controller 901 may include a suitable actuator, such as, for example, a hydraulic piston-cylinder assembly. Movement controllers 901 are configured to receive control signals and energy sources (e.g. in the form of electrical, electromechanical, and/or hydraulic power) regulated by internal controller 202 (shown in FIG. 3) and can actuate linear, rotatory, or oscillatory motion of subcritical power modules 200. Further, since movement controllers 901 are actively controlled, they can provide active shock absorbing during transport of subcritical power modules 200 to protect subcritical power modules 200 from vibratory and shock stresses.

Figure 16B:
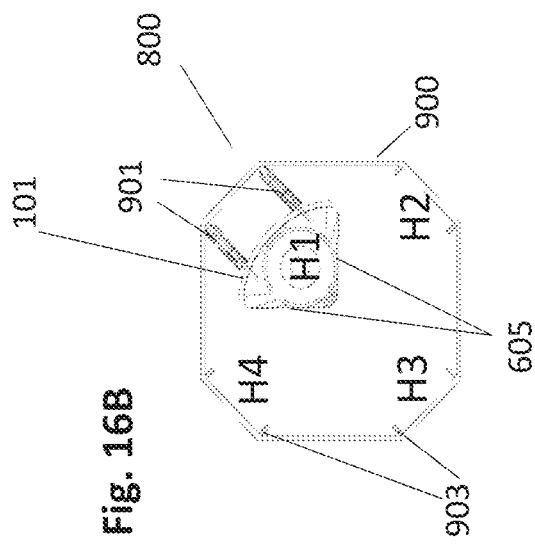
FIGS. 16A-D illustrate another exemplary embodiment of a subcritical power module assembled in a support structure to form an operational nuclear power system.
Figure 16D:
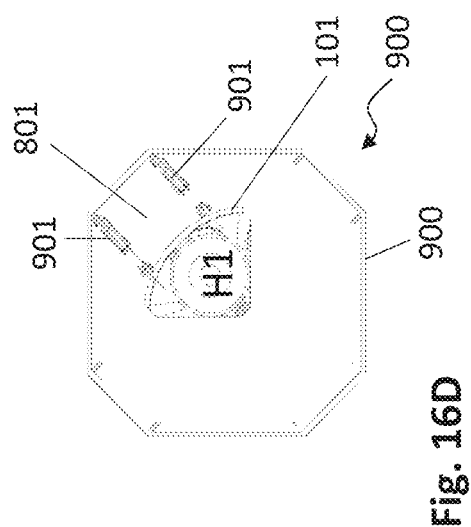
Figure 16A:
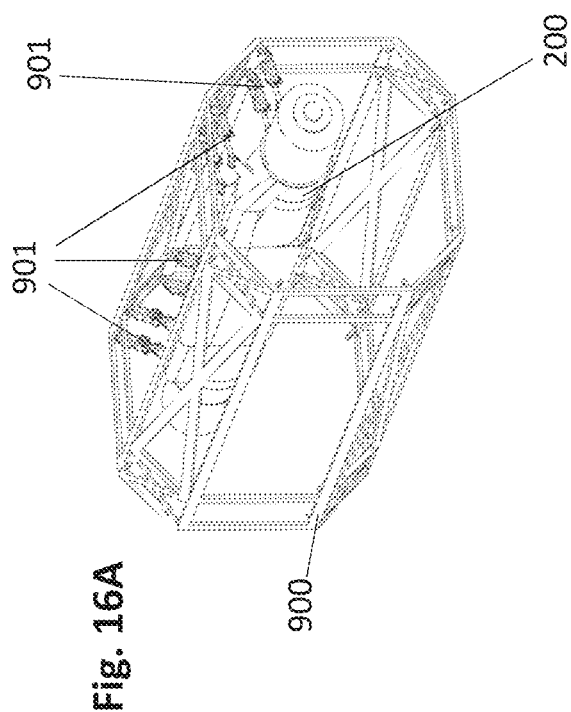

FIGS. 16A-16B and 16C-16D illustrate subcritical power module 200 in two different positions relative to support structure 900. In FIGS. 16A and 16B, subcritical power module 200, denoted by H1, is positioned by actuation of movement controllers 901 at a distance away from the center of support structure 900. Other remaining subcritical power modules 200, denoted by H2, H3, and H4, may be positioned as close as possible to one another, at an intermediate distance from the center of support structure 900, or at any location therebetween, depending on the desired operational characteristics. When subcritical power module H1 is positioned at a predetermined distance away from other subcritical power modules H2, H3, and H4, neutron interfaces 605 (see FIGS. 16B, 16C, and 17A) of subcritical power module H1 are substantially decoupled from neutron interfaces 605 of other subcritical power modules H2, H3, and H4. Consequently, the whole core formed by fuel cartridges 203 of subcritical power modules H1, H2, H3, and H4 may not satisfy the geometric and material buckling required to induce sustained chain reactions.

Neutron interfaces 605, as used herein, are the surfaces of subcritical power module 200 with the highest number of neutrons crossing housing 215 of subcritical power module 200. The number of neutrons crossing housing 215 of subcritical power module 200 at neutron interfaces 605 is proportionally to the relative position of each subcritical power module 200. For example, when subcritical power module H11 is positioned to form the configuration shown in FIGS. 16A-16B, the subcritical power module H11 remains in a subcritical state as neutron leakages out of neutron interfaces 605 are at maximum. If all subcritical power modules H1, H2, H3, and H4 are positioned away from one another, all of subcritical power modules H1, H2, H3, and H4 remain in a subcritical state as neutron leakages out of neutron interfaces 606 are at maximum, and the resulting core in this configuration cannot satisfy the geometric and material buckling required to sustain chain reactions. Depending on the position of subcritical power modules 200 in relation to one another, at the neutron interfaces 605, neutrons leaked from one subcritical power module 200 can become a gain for other subcritical power modules 200. Accordingly, portions of housing 215 of subcritical power module 200 that correspond to neutron interfaces 605 may be made of materials and/or have thicknesses suitable to enable neutrons transport with minimum damage to such materials. To conserve neutrons and thereby reduce the level of enrichment, portions of housing 215 that do not interface with other subcritical power modules 200 may be formed with thicker materials, forming neutron reflectors and radiation shield 101.

Figure 16C:
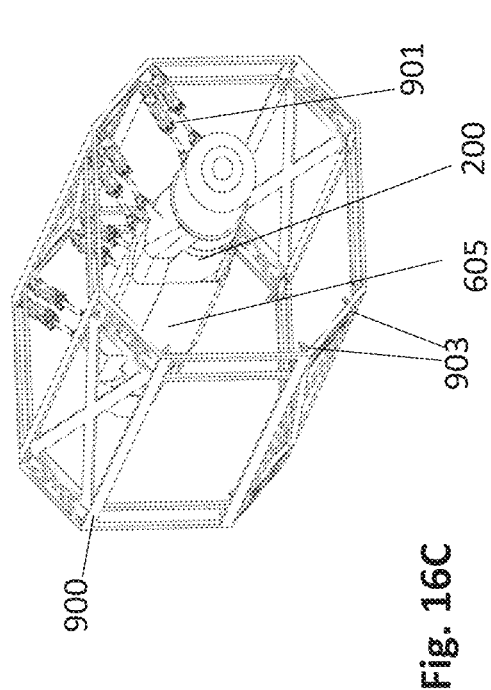

In FIGS. 16C and 16D, subcritical power module H11 is positioned by actuation of movement controllers 901 toward the center of support structure 900 (e.g., via maximum extension of movement controllers 901). Remaining subcritical power modules H2, H3 and H4 may be positioned close to or away from the center of support structure 900 and/or subcritical power module H1. Actively positioning subcritical power modules 200 in relation to one another induces neutron interactions impacting the reactivity of each fuel cartridge 203 inside individual subcritical power modules 200, thus directly resulting in active power regulation.

FIG. 17A is a perspective view of a subcritical power module 200, according to another exemplary embodiment of the present disclosure, and FIG. 17B is a cross-sectional view of subcritical power module 200 of FIG. 17A, illustrating various internal components therein. To simplify the visual representation, subcritical power module 200 is shown without portions of radiation shield 101 extending outside of support structure 900. Radiation shield 101 can be formed by multiple components with different radiation stopping characteristics, where the multiple components of radiation shield 101 may be thermally coupled to subcritical power modules 200 to support Brayton and Rankine thermodynamic cycles of subcritical power modules 200, as will be described in more detail with reference to FIG. 18.

As shown in FIG. 17A, subcritical power module 200 includes a plurality of module couplers 1001 integrally formed with housing 215 of subcritical power module 200 to facilitate the connection between subcritical power module 200 and movement controllers 901.

As shown in FIG. 17B, subcritical power module 200 includes a generator housing 1002 of housing generator 212, a motor housing 1003 of motor 209, a compressor turbine housing 1005 of compressor turbine 210 inside housing 215 of subcritical power module 200. Generator housing 1002 is coupled to compressor turbine housing 1005, and motor housing 1003 is coupled to power turbine housing 1006.

Motor housing 1003 includes motor 209 formed by a motor stator/rotor assembly 1007, which is thermally insulated from the working fluid circulating in the Brayton power cycle system and cooled by a secondary working fluid flowing through a motor cooling jacket 1101, which will be described in more detail with reference to FIG. 18. Compressor turbine housing 1005 includes a pair of low- and high-pressure compressor turbines 210L and 210H, respectively, which are directly coupled to a motor shaft 1009 of motor stator/rotor assembly 1007 to be mechanically driven by motor 209. The working fluid flowing through low- and high-pressure compressor turbines 210L and 210H is thermally coupled to intercooler heat exchanger 214 housed within compressor turbine housing 1005, such that the working fluid cools down while being compressed and circulated through fuel cartridge 203. Accordingly, as the working fluid is pressurized by compressor turbine 210 and cooled down by intercooler heat exchanger 214, it flows through a fuel cartridge header 1004 and cooling tubes 507 (FIG. 11) of fuel cartridge 203. At the opposite end of fuel cartridge 203, fuel cartridge 203 includes a fuel cartridge header (not shown) similar to fuel cartridge header 1004 disposed at its front end, and the working fluid flows to this cartridge header to expand through power turbine 211. After expansion in power turbine 211, the working fluid flows through first recuperator heat exchanger 208 to transfer its energy content to a secondary working fluid.

First recuperator heat exchanger 208 is housed in power turbine housing 1006, and power turbine 208 is directly coupled to a generator shaft 1010 of a generator stator/rotor assembly 1008. Power turbine housing 1006 also includes a inverted volute 1011 to radially distribute and cause flow reversal of the working fluid toward internal working fluid conduits 1103 surrounding fuel cartridge 203 (see FIG. 18). Accordingly, in this configuration, as the working fluid exits first recuperator heat exchanger 208, the working fluid is directed toward internal working fluid conduits 1103 surrounding fuel cartridge 203 and toward second recuperator heat exchanger 204 (see FIG. 18). As the working fluid further transfers its energy content in second recuperator heat exchanger 204, it undergoes another flow reversal as it flows through internal working fluid conduits 1103 disposed internally and substantially at the periphery of compressor turbine housing 1005. With the working fluid entering low-pressure compressor turbines 210L, the cycle restarts.

Figure 18:
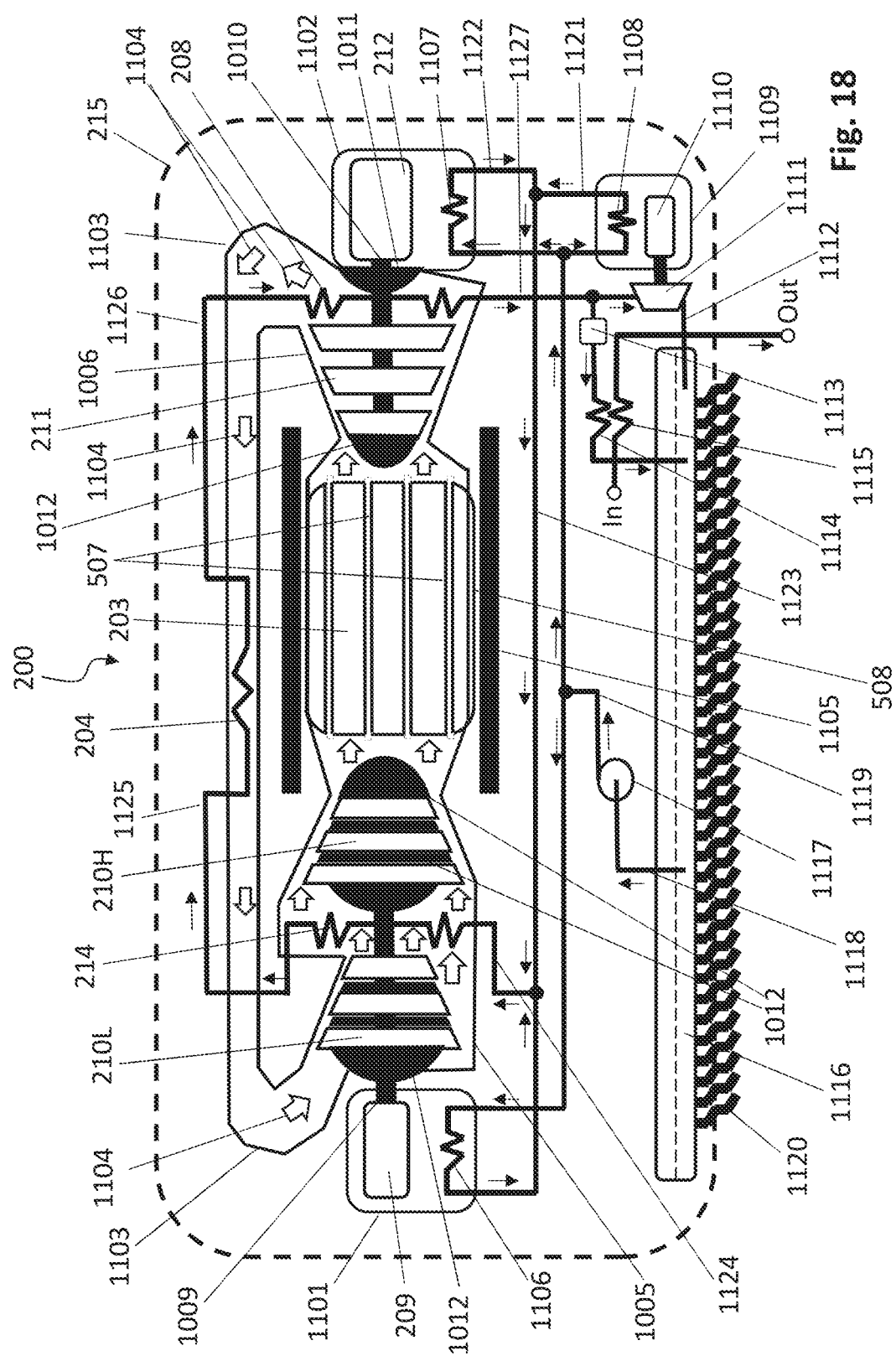
FIG. 18 is a functional schematic of the subcritical power module shown in FIGS. 17A-B.

FIG. 18 is a functional schematic of subcritical power module 200 described above with reference to FIGS. 16A-16D and 17A-17B. Subcritical power module 200 includes power conversion unit 201 having components configured to convert nuclear heat energy generated by fuel cartridge 203 to electricity through a unique configuration of combining a Brayton cycle and a Rankine cycle to exchange thermal energy between a hot thermal reservoir represented by fuel cartridge 203 and a cold thermal reservoir represented by the environmental air. It should be clarified that the term "power conversion unit," as used herein, is not limited to a single, integral unit; instead, as is consistent with the present disclosure, power conversion unit 200 may be a functional unit composed of various components physically separated and distributed throughout subcritical power module 200.

In general, power conversion from thermal energy to electrical energy occurs only through components operating under a Brayton cycle ("Brayton cycle components"). As mentioned above, subcritical power module 200 of the present disclosure utilizes a unique combination of a Brayton cycle and a Rankine cycle, where the working fluid undergoes a Brayton cycle as it flows through compressor turbine 210, fuel cartridge 203, and power turbine 211 and a Rankine cycle as it transfers waste thermal energy to a secondary working fluid (e.g., organic fluid or water/steam). Combining the Brayton cycle and the Rankine cycle may provide numerous advantages. For example, it may increase the thermodynamic efficiency of subcritical power module 200, reduce the thermal loading of some of the heat exchangers executing in a Brayton cycle (e.g., intercooler heat exchanger 214), and enhance cooling when subcritical power module 200 is temporarily or permanently shut down.

Another advantage of combining a Rankine cycle to a Brayton cycle lies in the possibility of generating electrical energy even when the components of the Brayton cycle are not in operation, such as during a shutdown condition. For example, as soon as subcritical power module 200 stops after operating in a critical condition for a period of time, fuel cartridge 203 starts to generate decay heat the magnitude of which is proportional to the time subcritical power module 200 has been operating. Under this non-operating condition, although the Brayton cycle components are not operational, the components operating under the Rankine cycle ("Rankine cycle components") can continue operation by converting thermal energy into electricity. As a result, subcritical power module 200 can continue to produce electricity proportionally to the amount of decay heat from fuel cartridges 203 when it is not in operation. That is, subcritical power modules 200 can continue to produce electricity when they are moved to a subcritical condition. Further, subcritical power module 200 may remain operational to produce electricity even when the nuclear fuel in fuel cartridge 203 has been depleted and is no longer capable of sustaining chain reactions or even when subcritical power module 200 is disposed at a storage facility.

With reference to FIG. 18, the operational characteristics of subcritical power module 200 will be described herein. To facilitate the understanding, the direction of the working fluid is indicated with arrows 1104. Starting from low-pressure compressor turbine 210L, the working fluid flows into low-pressure compressor turbine 210L and is compressed. The compressed working fluid then continues flowing through working fluid conduits 1103. Working fluid conduits 1103 are disposed internally and substantially in the periphery of housing 215 of subcritical power module 200 and extend into compressor turbine housing 1005 and power turbine housing 1006. Low- and high-pressure compressor turbines 210L and 210H are mechanically coupled to motor shaft 1009 and driven by motor 209. In this configuration, motor 209 is cooled by motor cooling jacket 1101 housed within motor housing 1003 (FIGS. 17A-17B). Motor cooling jacket 1101 is configured to thermally insulate motor 209 from the working fluid.

As the working fluid is compressed by low-pressure compressor turbine 210L, the temperature of the working fluid increases. To lower the temperature of the working fluid at this stage of the Brayton cycle, intercooler heat exchanger 214 is used to transfer the heat energy from the working fluid to a secondary fluid circulating in the Rankine cycle. The working fluid exiting intercooler heat exchanger 214 enters high-pressure compressor turbine 210H to receive further compression to increase its pressure (intercooler heat exchanger 214 may be configured to cool down the working fluid at each compressor stages). After exiting high-pressure compressor turbine 210H, the compressed working fluid flows into cooling tubes 507 (or cooling channels 506) of fuel cartridge 203 without mixing with fuel elements 502 or a moderator material contained in fuel cartridge 203. A portion of high-pressure compressor turbine 210H directly exposed to fuel cartridge 203 may be protected by a radiation shield 1012. As the working fluid flows through cooling tubes 507, its energy content increases while cooling fuel cartridge 203. The high-pressure, high-temperature working fluid exiting cooling tubes 506 of fuel cartridge 203 expands in power turbine 211, causing generator shaft 1010 coupled to power turbine 211 to rotate. Rotation of generator shaft 1010 causes generator 212 mechanically coupled to generator shaft 1010 to convert the mechanical energy into electricity. Similar to high-pressure compressor turbine 210H, a portion of power turbine 211 directly exposed to fuel cartridge 203 may be protected by a radiation shield 1012. Generator 212 is cooled by generator cooling jacket 1102, which is configured to thermally insulate generator 212 while providing cooling via a generator heat exchanger 1107. Generator cooling jacket 1102 is housed within generator housing 1002 (FIGS. 17A-17B).

After being discharged from power turbine 211, the working fluid transfers its thermal energy to the secondary working fluid through first recuperator heat exchanger 208 and through second recuperator heat exchanger 204 positioned within the pathways formed by internal working fluid conduits 1103 before entering low-pressure compressor turbine 210L to reset the Brayton cycle. Further, as the working fluid exits power turbine 211, it changes its direction via inverted volute 1011 that redirects the working fluid into internal fluid conduits 1103.

The secondary fluid, which may be an organic fluid or water/steam, operates under a Rankine cycle, whose high-temperature thermal source includes the waste energy normally rejected by the Brayton cycle components, the decay heat energy from fuel cartridge 203 in a subcritical state, and the thermal energy generated in the shield 101 as a result of radiation attenuation. As shown in FIG. 18, the secondary working fluid may be contained in a fluid reservoir 1116. The secondary working fluid is pressurized by pump 1117 and discharged to a pressurized loop represented by a series of tubing 1112, 1118, 1119, 1121, 1122, 1123, 1124, 1125, 1126, and 1127 disposed inside housing 215 of subcritical power module 215.

When the secondary working fluid flows through a motor heat exchanger 1106, housed within motor cooling jacket 1101, it cools down motor 209 while increasing its energy content. Similarly, when the secondary working fluid flows through generator heat exchanger 1107, housed within generator cooling jacket 1102, it cools down generator 212 while increasing its energy content. The Rankine cycle components includes a Ranking electric generator 1110 and a Rankine generator heat exchanger 1108 housed within a Rankine generator cooling jacket 1109. The secondary working fluid flows through Rankine generator heat exchanger 1108 to cool Rankine electric generator 1110. As a result, the secondary working fluid inlets intercooler heat exchanger 214 via intercooler pressure tubing 1124 after receiving thermal energy from cooling motor 209, generator 212, and Rankine electric generator 1110.

As mentioned above, when the secondary working fluid flows through intercooler heat exchanger 214, it receives thermal energy from the working fluid as the working fluid is being compressed and heated by low- and high-pressure compressor turbines 210L and 210H. Additional thermal energy is transferred to the secondary working fluid as it flows through second recuperator heat exchanger 204 and through first recuperator heat exchanger 208. The first recuperator heat exchanger 208 and second recuperator heat exchanger 204 are thermally coupled to internal working fluid conduits 1103, which extend into compressor turbine housing 1005 and power turbine housing 1006. Thermal coupling of second recuperator heat exchanger 204 and first recuperator heat exchanger 208 with the working fluid circulating within internal working fluid conduits 1103 can be achieved by, for example, positioning heat exchangers 204 and 208 in the flow pathways of the working fluid, in a manner that minimizes potential increases in back pressure at the discharge of power turbine 211 and at the discharge of low-pressure compressor turbine 210L. At the outlet of first recuperator heat exchanger 208, the secondary working fluid is at the highest pressure and temperature through pressure tube 1127 and, under a first configuration of a process heat control valve 1113, the secondary working fluid expands through a Rankine turbine 1111 providing a second source of electrical power through Rankine electric generator 1110. As the secondary working fluid is discharged at Rankine turbine 1111, it enters fluid reservoir 1116, where it transfers its thermal energy to the environment by thermal coupling with radiation shield 1120 (e.g., similar to radiation shield 101 in FIGS. 1A, 1B, and 2). The secondary working fluid in fluid reservoir 1116 cools down and resets the Rankine cycle.

In a second configuration of process heat control valve 1113, the secondary working fluid at maximum temperature and pressure can flow from pressure tubing 1127 to a Rankine process heat exchanger 1114 and discharge into fluid reservoir 1116, thus partially or entirely bypassing Rankine turbine 1111. This configuration allows regulating the electric power generated by Rankine generator 1110. Rankine process heat exchanger 1114 enables transferring thermal energy of the secondary working fluid to an external fluid used to, for example, support applications requiring process heat. Under this configuration, the external fluid inlets Rankine process heat exchanger 1114 and undergoes thermal energy transfer from the secondary working fluid to the external fluid according to the configuration of process heat control valve 1113 and the amount of electric energy produced by Rankine electric generator 1110.

FIGS. 19A-19D illustrate different configurations of power conversion unit 201 of subcritical power module 200, according to various exemplary embodiments of the present disclosure. In all of the disclosed configurations, fuel cartridge 203 is positioned substantially at the center with respect to radiation shield 101 and reflector 1105, while the components of power conversion unit 201 (e.g., compressor turbine 210, power turbine 211, and generator 212) can be placed with different layouts. In some embodiments, such as those shown in FIGS. 19A and 19C, one or more battery banks 104 positioned outside subcritical power module 200 for supporting load following and start-up operations may serve as external radiation shields to increase radiation shielding.

In the embodiment shown in FIG. 19A, power conversion unit 201 is configured to drive compressor turbine 210 through mechanical coupling with an elongated shaft 1200. Elongated shaft 1200 is directly or indirectly coupled to compressor turbine 210. Elongated shaft 1200 is also directly or indirectly coupled to power turbine 211 and generator 212. In this configuration, radiation shield 101 can be positioned to surround compressor turbine 210, and second recuperator heat exchanger 204 may be positioned in internal working fluid conduits 1103 (FIG. 18) formed between housing 215 of subcritical power module 200 and reflector 1105.

In the embodiment shown in FIG. 19B, generator 212 is positioned outside of radiation shield 101. In this configuration, the coupling between generator 212 and the rotary components of power conversion unit 201 is magnetic, where elongated shaft 1200 mechanically couples the rotary components of compressor turbine 210 and power turbine 211. In this configuration, radiation shield 101 surrounds and seals subcritical power module 200. Accordingly, subcritical power module 200 can have two pressure containers as housing 215 of subcritical power module 200 also provides a pressure containment therewith.

In the embodiment shown in FIG. 19C, generator 212 and the rotary components of compressor turbine 210 and power turbine 211 may be grouped and mechanically coupled to execute the Brayton cycle. For example, compressor turbine 210 suctions the working fluid as it undergoes thermal energy transfer with second recuperator heat exchanger 204 and first recuperator heat exchanger 208 (see FIG. 18).

In the embodiment shown in FIG. 19D, the rotary components of power conversion unit 201 are independent as compressor turbine 210 is electrically driven by motor 209, while power turbine 211 drives generator 212 as it converts thermal energy into electricity. Accordingly, electric power produced by generator 212 can be distributed in a manner that the decoupled turbo-machinery components forming compressor turbine 210 and power turbine 211 are operated at optimum speed, thus increasing efficiency. In addition, by electrically and independently controlling compressor turbine 210, the thermal-hydraulic and neutronic coupling can be fine-tuned as a function of electric demand, thereby increasing load-following performance (e.g., varying compressor turbine speed affects working fluid mass-flow-rate and compression ratio, which impacts temperature changes inducing changes in the neutronics, which in turn affect power generation).

The preceding description of the disclosed embodiments is provided to enable any person skilled in the art to make or use the claims. Various modifications to these embodiments will be readily apparent to those skilled in the art, and the generic principles defined herein may be applied to other embodiments and implementations without departing from the scope of the claims. Thus, the present disclosure is not intended to be limited to the embodiments and implementations described herein, but is to be accorded the widest scope consistent with the following claims and the principles and novel features disclosed herein.

What is claimed is:

1. A transportable nuclear power system, comprising:
   an intermodal transport container containing a nuclear power generator including one or more fuel cartridges configured to form a critical core during a power generation operation, each of the one or more fuel cartridges containing a nuclear fuel, the nuclear power generator being operational to generate heat during transportation within the ISO transport container;
   an operational power conversion unit disposed inside the transport container;
   a support structure mounted inside the transport container to support at least the one or more fuel cartridges; and
   an internal controller disposed inside the transport container and configured to control a reactivity of the one or more fuel cartridges and to control actuators to actively position the fuel cartridges during the power generation operation.

2. The transportable nuclear power system of claim 1, further comprising:
   a radiation shield thermally coupled on one side to the transport container and on the other side to a reflector, a sealed housing, and the one or more fuel cartridges to provide a heat transfer between the one or more fuel cartridges, the transport container, and the environment surrounding the transport container to cool down the one or more fuel cartridges.

3. The transportable nuclear power system of claim 1, further comprising:
   a sealed pressure containment formed by a radiation shield that includes a neutron reflector substantially surrounding a sealed housing, forming multiple pressure boundaries to contain potential leakages from one or more fuel cartridges and one or more working fluid conduits, each of the one or more working fluid conduits containing a working fluid circulating within each of the one or more fuel cartridges to cool the nuclear fuel and execute a thermodynamic cycle.

4. The transportable nuclear power system of claim 3, further comprising:
   a compressor turbine and a power turbine disposed at opposite ends of each of the one or more fuel cartridges,
   wherein the compressor turbine and the power turbine are disposed inside the sealed housing, inside the reflector, and inside the pressure containment.

5. The transportable nuclear power system of claim 4, further comprising a generator coupled with the power turbine sealed within the sealed housing,
- wherein the working fluid is configured to expand to drive the power turbine to rotate, the rotation of the power turbine causes the generator to convert mechanical energy of the power turbine into electrical energy, and
- wherein the generator is disposed inside the pressure containment.

6. The transportable nuclear power system of claim 1, further comprising:
- electronic control and communication equipment, battery banks, and actuators for positioning sub-critical power modules enabling full operations by generating thermal energy from fission and decay heat resulting from the electronic control and communication equipment operations of the fuel cartridges and by converting the thermal energy to electrical energy during a stationary deployment.

* * * * *